Patented Dec. 29, 1936

2,065,676

UNITED STATES PATENT OFFICE 2,065,676

PROCESS OF MAKING FAT-CONTAINING POWDER

Elmer J. Fechner, Shelbyville, Ind., assignor to The Page Milk Company, Shelbyville, Ind., a corporation of Indiana No Drawing. Application August 24, 1934, Serial No. 741,279

7 Claims. (Cl. 99—118)

My invention relates to comminuted, dry, fat-containing materials; prepared flours made with such a material; and a process of making such materials and prepared flour.

It is the object of my invention to produce a dry powder which will contain a preponderant amount of fat; and more particularly to produce such a powder which may be used to supply shortening requirements in dough for baking food-products, and especially in baking such products as bread, cake, biscuits, etc., which contains a sufficiently high percentage of fat to satisfy all the shortening requirements of such dough without including any other ingredients not normally used therein, and is adapted to be readily mixed with the other dry ingredients of such dough to completely disperse the shortening fat throughout the mixture. It is my further object to have the powder in such condition that the shortening value of its fat will be fully available in the dough, substantially to the same extent as, if not even to a somewhat greater extent than, would be the case if the same fat were mixed while in its normal state with the flour which forms the principal dry ingredient of such dough; and yet to have such powder in stable condition so that its shortening value will not depreciate, especially when the powder is used in so-called prepared flours, which are marketed in dry form.

Although my process of making fat-containing powders is applicable to the production of various kinds of such powders, for convenience and by way of example I will describe the invention in connection with the preparation of a powder which contains a shortening fat. I call such powder "dry shortening".

In the manufacture of such dry shortening, I prepare a hot mixture of a desired fat, milk, and sufficient water if any added water is necessary to bring the solids-content of the mixture to proper value for spray-drying; homogenize such hot mixture; and quick dry the homogenized mixture as by atomization into an atmosphere of hot gaseous drying medium, to dry it to a powder; and then immediately cool the dry powder. Such dry powder will contain within itself the solids from the milk, and the fat.

The proportion of fat to milk-solids in the dry shortening will depend upon the particular use to which it is to be put; for the proportion should be such as will permit the use of a sufficient quantity of dry shortening to satisfy all the fat requirements, as in a dough-mix, without including more milk-solids than the normal amount otherwise used in such dough-mix. In the preparation of some dough-mixes, dry shortening containing 50% fat and 50% milk-solids will meet these requirements. In others, that proportion gives too great an amount of milk solids. A dry shortening can readily be made by my process with a fat content as high as 96%, but I have found that a dry shortening containing 80% fat has sufficient fat and not too much milk-solids to meet the requirements of substantially any dough-mix. In the commercial preparation of dry shortening I have standardized on a 50%-fat and an 80%-fat product.

The fat used in my dry shortening may be any edible fat foreign to natural milk which has adequate shortening value, and by "fat" (unless otherwise specified) I mean to include both liquids and solids. However, I prefer to use a fat which is solid at room temperature and desirably one that inherently has good keeping qualities. I consider fats of vegetable origin preferable to those of animal origin; and I have found hydrogenated vegetable fats especially suitable, such as hydrogenated sesame oil and hydrogenated cottonseed oil, the latter being more desirable because of its lower cost. In addition, I have found that the dry shortening is improved by the use of a slight amount of butter fat along with the vegetable fat—as to the extent of about 1 or 2% based on the final product.

The milk used in the dry shortening is preferably fresh skim-milk which has not previously been dehydrated; and any butter fat to be used may conveniently be included by adding to the skim-milk sufficient whole milk to supply the desired amount of such butter fat. Skim milk contains approximately 10% of non-fatty materials which will form solids when such milk is dried; and the remainder, save for any small amount of fat which remains, is substantially all water. The relationship of solids-forming material to water varies slightly according to the source of the milk, and the proportions given hereafter may therefore require some modification to suit those conditions, but I will use this figure of 10% solids-forming material as a convenient and approximately correct one.

In making dry-shortening I mix the desired fat and milk at a temperature sufficient to melt the fat, which in the case of hydrogenated cottonseed oil is about 110° F. The mixture is later to be homogenized, as will be described, and before homogenization should be brought to a temperature of at least 145° F., and desirably to about 170° F.; and this temperature may be obtained either by suitably heating the ingredients before they are mixed or by heating the mixture after such mixing, depending upon convenience. However, the milk should not be raised above about 175° F. either before or after it is mixed with the fat. I have found the range of temperatures from 165° to 175° F. preferable, and I desirably maintain such temperature throughout the process; for that procedure serves to condition the ingredients and pasteurize them, and gives a better product. Also, I have found that best results are obtained when the total content of solids and solids-forming materials (including fat) in the mixture does not exceed about 30% during the spraying operation of spray-drying. The normal water content of the milk is sufficient to produce this low percentage of solids-forming material in mixtures for the preparation of dry-shortening containing up to approximately 75% fat; but for dry-shortening of higher fat content than that I add sufficient water to the hot mixture of fat and milk before it is sprayed in the drying process to reduce the percentage of solids-forming material in such mixture to about 30% or even less, to obtain the proper solids-content for best drying conditions. This extra water, when used, may be added either before or after homogenization. Such solids-content may be determined by suitable test, but an experienced operator can usually determine it with sufficient accuracy by mere observation of consistency.

When the suitably hot mixture has been thoroughly stirred, to get an even distribution of the fat, it is homogenized to break up the fat into very fine globules. The homogenization is generally in accordance with standard practice, in which the material to be homogenized is forced through very fine openings under a high pressure. I have found suitable pressures to be from 2,000 to 4,500 lbs. per square inch, depending on conditions; such as the temperature of the mixture, the proportion of fat, and the kind of fat used. The purpose of homogenization is to break up the fat into very small particles; for, generally speaking, the smaller such particles are, the better the results which will be obtained.

When the mixture has been homogenized, it is then dried. Of the various known methods of drying, I consider spray-drying the most suitable, and prefer the Gray-Jensen process. In that process, the homogenized mixture is sprayed through a small spray nozzle at a high pressure into hot dry air, which absorbs the moisture from the mixture and leaves the fat and milk solids in the form of a dry powder.

This powder should not be allowed to accumulate in the hot drying compartment, for the continued heat will scorch it; but should be immediately removed and cooled. It is also desirable to prevent the powder from being compacted before it has been cooled to approximately room temperature. I have found that the material can be prevented from becoming compacted by conducting it from the drying chamber with a stream of cool air.

When the powder has been cooled, it is sifted, and is ready to be packed for shipment or to be used.

My dry-shortening powder made by this process is relatively heat-stable; so that it need not be refrigerated in order to preserve it, and ordinary temperatures do not release the fat. Indeed, the dry shortening will carbonize under heat before the fat is released. Moreover, its stability against the effects of ordinary temperatures is an enduring one, for the fat will not soak out upon standing; so that when it is used in a prepared flour, and such flour is stored as on a grocer's shelf, the fat will not soak out and produce an unsightly package. The character of the dry-shortening is such that it keeps much better than does the fat from which it was made, usually from 80% to 130% longer than does such fat alone, before it becomes rancid under the same conditions. These properties are apparently due to the structure of the particles of the finely comminuted dry-shortening; for generally speaking, the particles have a central core of fat, with a covering consisting of milk solids deposited in situ by the quick exaporation of the watery mixture and adsorbed on that core of fat, each particle being very small on account of the fine subdivision which homogenization produces.

I give below two illustrative examples of the application of my process in making my new product. Both are based on records of actual operations in the commercial manufacture of dry shortening, where the drying unit used operated in accordance with the Gray-Jensen spray-drying process. Example I illustrates my process as applied to the manufacture of dry-shortening containing 50% hydrogenated sesame oil and 50% skim-milk solids; and Example II illustrates the process as applied to the manufacture of dry-shortening containing 78% hydrogenated cottonseed oil, 2% butter fat (or 80% total fat), and 20% skim-milk solids.

*Example I. 50% fat and 50% skim-milk solids*

1,000 lbs. of skim-milk, heated to about 150° to 175° F., and 100 lbs. of hydrogenated sesame oil, desirably heated to about the same temperature, were mixed together and thoroughly stirred with an electric mixer (known commercially as a "Lightnin Mixer") to get an even distribution of shortening fat throughout the mixture. I prefer to have both ingredients at a temperature of between 165° and 170° F. The mixture was then homogenized at a pressure of about 2000 to 3000 lbs. per square inch, to get complete breaking down of the shortening fat into small evenly sized globules. Then it was spray-dried in a Gray-Jensen drier; and the dry powder thus obtained was promptly carried away from the drying chamber, desirably by a blast of cool air. The temperature of the mixture of skim milk and hydrogenated sesame oil was maintained both before and after the homogenization at about 150° to 175° F., desirably between 165° and 170° F., up to the time the mixture left the supply tank of the drier. In the spray-drying, as in the Gray-Jensen drier, the incoming air was raised to a temperature of about 260° F., but was varied to maintain an air temperature of between 185° and 190 F. at the bottom of the drying chamber, where the dry powder was taken off, as by the blast of cold air. The spray nozzle used was a tapered nozzle with a diameter of 0.058 inch at its inner end and 0.056 inch at its discharge end. The spraying pressure was about 4000 lbs. per square inch. The dried powder, after being withdrawn from the drier and promptly cooled, and after being sifted, was ready for packaging. It contained the 10%, or 100 lbs., of milk solids from the original milk, and the 100 lbs. of fat of the hydrogenated sesame oil, to make the 50%–50% final product.

*Example II. 80% fat and 20% skim-milk solids*

The ingredients used are listed below; with their contents set forth, to illustrate the method of calculating the necessary proportions.

| Ingredient | Quantity | Contents | | |
|---|---|---|---|---|
| | | Solids | | Water |
| | | Fat | Skim-milk solids | |
| Hydrogenated cottonseed oil | 390 lb | 390 lb | | |
| Whole milk containing 3.5% butter fat | 285 lb | 10 lb | 27.5 lb | 247.5 lb |
| Skim milk | 725 lb | Negligible | 72.5 lb | 652.5 lb |
| Additional water | 267 lb | | | 267 lb |
| Totals | 1,667 lb | 400 lb | 100 lb | 1,167 lb |
| Percentages in fluid mixture | | 30% total solids | | 70% water |
| Percentages in dry-shortening | | 80% | 20% | |

The several ingredients were mixed together at a temperature at or above 110° F., where the hydrogenated cottonseed oil melted. The mixture was thoroughly stirred as in Example I, to distribute the fat evenly; and was brought to a temperature of about 165° F. Then, after such additional heating as needed to reach the desired temperature of about 165°–170° F., it was homogenized at a pressure of 4000 lbs. per square inch, the temperature of the mixture being maintained both before and after the homogenization at about 165°–170° F. The hot homogenized mixture was then immediately spray-dried, and the dry powder was conveyed out of the hot drying chamber, cooled, sifted, and packaged, as in Example I.

My dry shortening has many advantages generally in baking. It can be mixed while dry with the flour and other dry ingredients of a dough-mix, and this dry mixing makes it possible to easily secure a uniform and complete dispersion of the fat throughout the flour—a result which is difficult to obtain when the fat is mixed in its natural state, except perhaps by the use of heavy and expensive machinery. The butter-content, even though small, of a dry-shortening such as that made in accordance with Example II makes the baked product more tender and of a richer taste than when vegetable fat alone is used.

The great dispersion of the fat throughout the flour makes the resulting baked food-product a better one; and in some cases I have even found some increase in the shortening value of the fat used, so that it was possible to decrease slightly the amount of shortening required. The amount of dry-shortening required, however, can be readily determined; for since the shortening value of the fat contained therein is all available, and since the fat content of the dry-shortening is known, it is only necessary to compute the amount required from these known values. Thus, the shortening value of one (1) pound of the original fat would be contained in one and a quarter (1¼) pounds of dry shortening containing 80% fat and 20% milk solids, or in two (2) pounds of dry shortening containing 50% fat and 50% milk solids.

My dry-shortening is not only of great advantage generally in the baking art, where the fact that it supplies shortening in dry form makes it possible to easily secure complete dispersion of the shortening throughout the dough mix, but it is particularly valuable for use in prepared flours.

Prepared flours are offered in dry form to the ultimate consumer, for his use. It is very desirable that they contain all the ingredients necessary except water or milk, so that it will only be necessary for the consumer to add water and/or milk before baking. Hitherto it has been difficult to include shortening in such prepared flours without the installation and use of special mixing equipment. With the use of my dry-shortening, this difficulty is now removed. Thus prepared flours, complete except for water, might be compounded as set forth in the following illustrative examples:

Example III. White layer cake

A prepared flour suitable for making "white layer cake" contains:

| Ingredient | Parts by weight |
|---|---|
| Flour (soft winter) | 100 |
| Powdered sugar | 100 |
| Dry shortening (80% shortening fat—20% skim milk solids) | 44 |
| Powdered egg white | 5.5 |
| Soda | 1.5 |
| Pyrophosphate | 2.25 |
| Salt | 1.5 |
| Vanillin | .01 |

In the use of this prepared flour, two cups of the prepared flour are mixed well with ¾ cup of water or milk to get a soft, smooth batter; and the mix then baked at 375° for twenty-five (25) minutes.

Example IV. Biscuits

A prepared flour suitable for making biscuits contains:

| Ingredient | Parts by weight |
|---|---|
| Flour (blended soft and hard wheat) | 100 |
| Dry shortening (80% shortening fat—20% skim milk solids) | 20 |
| Dry skim milk | 4 |
| Soda | 1.5 |
| Pyrophosphate | 1.06 |
| Monocalcium phosphate | 1.18 |
| Salt | 1.0 |
| Sugar | 2.0 |

In use, this prepared flour is mixed with milk or water in the proportions of two cups of flour to ⅔ cup of milk or water. The dough is rolled and folded, and baked twelve (12) minutes at 450° F.

In Example IV above the amount of dry shortening used, while sufficient to supply the shortening needs, is not sufficient to supply the milk-solids requirements, and additional milk powder is specified. Nevertheless, as has been pointed out, it is possible to make the dry shortening with any desired proportion between the fat and the milk solids, so that the requirements both for shortening and for milk solids may be supplied completely by a dry shortening, as is the case in Example III.

This present application relates particularly to fat-containing materials which contain more than about 75% fat and which are made by the process described above in which additional water is added, and to such process and prepared flours using such material. The fat-containing materials, the process, and prepared flours using such materials are claimed broadly, and specifically with respect to a process in which no additional water is added, in my co-pending application Serial No. 627,219, filed August 1, 1932, for Fat-containing powder and process of making it.

I claim as my invention:

1. The process of producing a comminuted dry powder containing about 75% or more of fat, comprising preparing from fat and milk a mixture having a temperature of between about 145° and about 175° F., the fat content of said mixture constituting at least 75% of the solids and solids-forming material therein, including in such mixture sufficient water to reduce the percentage of solids and solids-forming material to below about 30% of the mixture, homogenizing the mixture at that temperature, quick drying the homogenized mixture to form a dry powder, and promptly cooling such powder.

2. The process of producing a comminuted dry shortening powder containing about 75% or more of fat, comprising preparing from shortening fat foreign to natural milk and milk a mixture having a temperature of between about 145° and about 175° F., the fat content of said mixture constituting at least 75% of the solids and solids-forming material therein, including in such mixture sufficient water to reduce the percentage of solids and solids-forming material to below about 30% of the mixture, homogenizing the mixture at that temperature, quick drying the homogenized mixture to form a dry powder, and promptly cooling such powder.

3. The process of producing a comminuted dry shortening powder containing about 75% or more of fat, comprising preparing from shortening fat foreign to natural milk and milk a mixture having a temperature of between about 145° and about 175° F., the fat content of said mixture constituting at least 75% of the solids and solids-forming material therein and including about 2% of butter fat, including in such mixture sufficient water to reduce the percentage of solids and solids-forming material to below about 30% of the mixture, homogenizing the mixture at that temperature, quick drying the homogenized mixture to form a dry powder, and promptly cooling such powder.

4. The process of producing a comminuted dry shortening, comprising preparing from hydrogenated cottonseed oil and substantially fat-free milk a mixture having a temperature of from about 165° to 175° F. and having such high fat content that the total solids and solids-forming material constitutes more than about 30% of the combined fat and milk, including in such mixture sufficient water to reduce the percentage of such material to below 30% of the mixture, homogenizing said hot mixture, quick drying the hot homogenized mixture by atomization to remove the moisture and leave the fat particles covered with milk solids deposited in situ, and quickly cooling said particles.

5. The process of producing a comminuted dry shortening, comprising preparing from hydrogenated cottonseed oil and substantially fat-free milk a mixture having a temperature of from about 165° to 175° F. and having a total fat content constituting approximately 80% of the total content of solids and solids-forming material, including in such mixture sufficient water to reduce the percentage of such material to below 30% of the mixture, homogenizing said hot mixture, quick drying the hot homogenized mixture by atomization to remove the moisture and leave the fat particles covered with milk solids deposited in situ, and quickly cooling said particles.

6. The process of producing a comminuted dry powder containing approximately 80% fat, comprising preparing a hot mixture of the following ingredients in approximately the proportions given:

| Ingredient | Parts by weight |
| --- | --- |
| Hydrogenated cotton-seed oil | 390 |
| Butter fat | 10 |
| Skim-milk | 1000 |
| Water | 267 | the temperature of said mixture being between about 145° and about 175° F., homogenizing the hot mixture, promptly drying such hot homogenized mixture by atomization in a hot gaseous drying medium to form a powder, and promptly removing said powder from the presence of the drying medium and cooling it without permitting it to accumulate or to become compacted while hot.

7. The process of producing a comminuted dry powder containing approximately 80% fat, comprising preparing a hot mixture of the following ingredients in approximately the proportions given:

| Ingredient | Parts by weight |
| --- | --- |
| Fat, of which at least about 97% is hydrogenated vegetable oil | 400 |
| Skim-milk | 1000 |
| Water | 267 | the temperature of said mixture being between about 145° and about 175° F., homogenizing the hot mixture, promptly drying such hot homogenized mixture by atomization in a hot gaseous drying medium to form a powder, and promptly removing said powder from the presence of the drying medium and cooling it without permitting it to accumulate or become compacted while hot.

ELMER J. FECHNER.